United States Patent
Rouvellou

(10) Patent No.: US 6,950,562 B2
(45) Date of Patent: Sep. 27, 2005

(54) DATA PROCESSING METHOD

(75) Inventor: Laurent Jean Marie Rouvellou, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 10/028,100

(22) Filed: Dec. 21, 2001

(65) Prior Publication Data

US 2002/0126912 A1 Sep. 12, 2002

(30) Foreign Application Priority Data

Dec. 26, 2000 (FR) .............................. 00 17039

(51) Int. Cl.[7] .............................................. G06K 9/40
(52) U.S. Cl. ..................... 382/264; 382/268; 382/205
(58) Field of Search ................................ 382/264, 266, 382/268, 205, 176

(56) References Cited

U.S. PATENT DOCUMENTS

| | | | | |
|---|---|---|---|---|
| 5,384,849 A | * | 1/1995 | Jeong ..................... | 348/425.2 |
| 5,422,964 A | | 6/1995 | Devimeux et al. ........... | 382/226 |
| 5,701,368 A | * | 12/1997 | Jung .......................... | 382/239 |
| 5,877,813 A | * | 3/1999 | Lee et al. ................. | 375/240.12 |
| 6,175,596 B1 | * | 1/2001 | Kobayashi et al. ..... | 375/240.27 |
| 6,317,522 B1 | * | 11/2001 | Rackett ....................... | 382/268 |
| 6,529,638 B1 | * | 3/2003 | Westerman ............... | 382/275 |
| 6,728,414 B1 | * | 4/2004 | Chang et al. ............ | 382/254 |
| 6,741,752 B1 | * | 5/2004 | Yang ........................ | 382/268 |

FOREIGN PATENT DOCUMENTS

| EP | 0817497 A2 | 9/1996 | ............ H04N/7/50 |
|---|---|---|---|
| EP | 0998149 A1 | 10/1999 | ............ H04N/7/30 |

* cited by examiner

*Primary Examiner*—Joseph Mancuso
*Assistant Examiner*—Manav Seth

(57) ABSTRACT

The present invention relates to a method of processing data contained in a digital input image. The data processing method comprises a gradient filter step (GF) of values (Y) of the pixels, which permits to detect (THR) a natural contour area (NC) inside the digital input image. The invention also comprises a step (BAD) of detecting blocking artifacts originating from a block-based coding technique, from a calculation (CT) of a discontinuity value based on values (Y) of a current pixel and of pixels adjacent to said current pixel. The method finally comprises a low-pass filter step (LPF) of the values (Y) of the pixels coming from the artifact blocking detection step (BAD) with the exception of the pixels contained in the natural contour areas (NC) determined by the gradient filter step.

9 Claims, 4 Drawing Sheets

Figure 1:
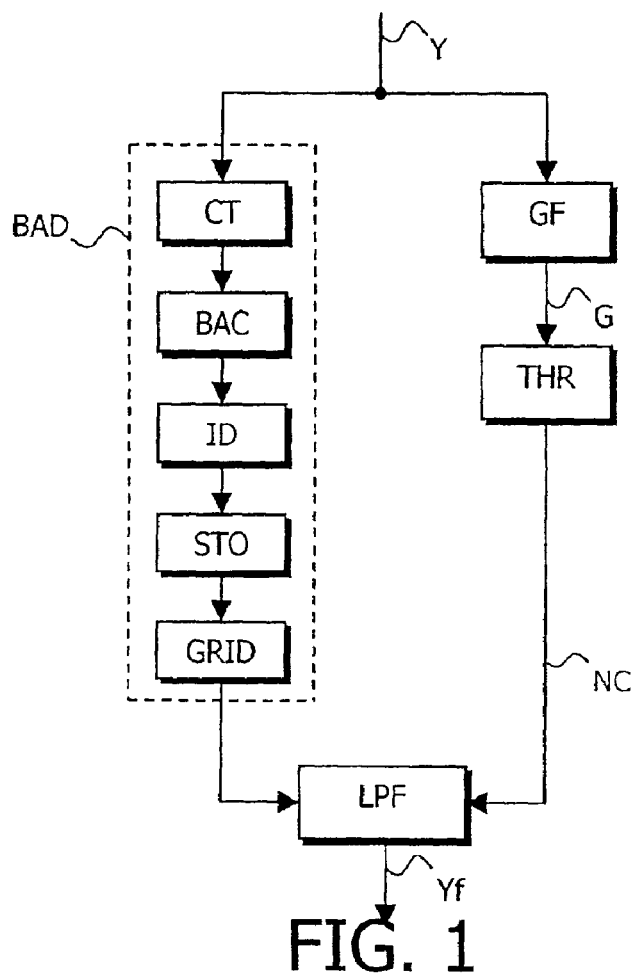

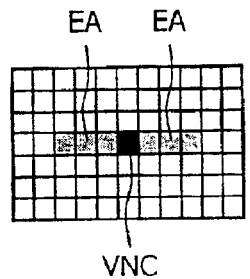
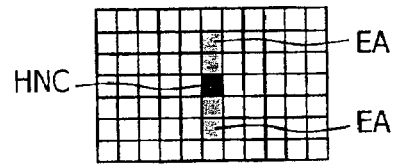
FIG. 7a  FIG. 7b
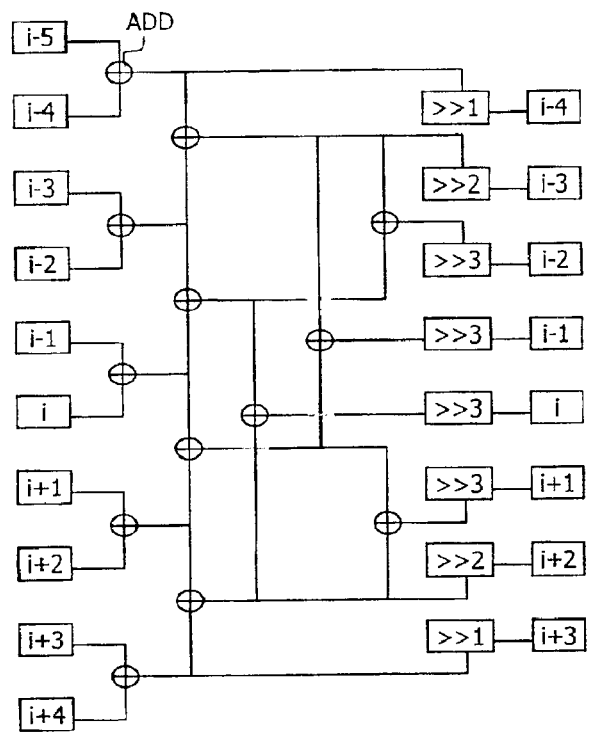
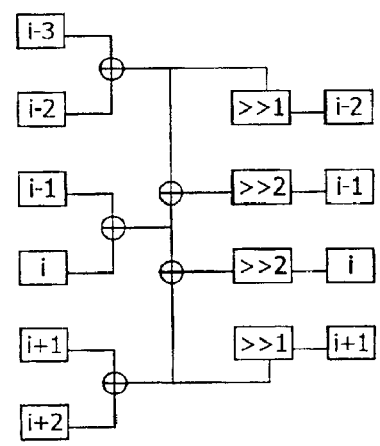
FIG. 8a  FIG. 8b

DATA PROCESSING METHOD

The present invention relates to a method of processing data contained in a digital input image.

The invention finds its application in the detection of blocks in a previously coded and then decoded digital image according to a block-based coding technique, for example, the MPEG standard (Motion Pictures Expert Group) and in the correction of the data comprised in these blocks for attenuating the visual artifacts caused by the block-based coding technique.

European patent application no. 0 817 497 A2 describes a method which permits to reduce blocking artifacts and artifacts due to the ringing noise of a motion-compensated image. For this purpose, the processing method according to the prior art comprises a gradient filter step which permits to generate a binary edge map on which global thresholding and local thresholding are performed. Said method comprises a step which permits to decide whether an area inside the binary edge map, which area is determined with the aid of a filter window, is a homogeneous area or a edge-containing area. The method finally comprises a filter step which utilizes a first set of predetermined coefficients if the area is homogeneous, and a second set of predetermined coefficients if the area contains edges, the second set of predetermined coefficients being adapted as a function of the position of the contours in the area.

It is an object of the present invention to propose a data processing method which permits to detect in a simple and efficient manner blocking artifacts which are due to the compression of the data. The invention takes the following considerations into account.

The data processing method according to the prior art requires the calculation of an average and of a standard deviation of gradient values of the pixels belonging to a block for each block of the digital input image. Such a calculation is costly in terms of calculation resources, which renders such a method complex to implement.

In order to mitigate these disadvantages, the data processing method according to the present invention is characterized in that it comprises a step of detecting blocking artifacts which originate from a block-based coding technique, said detection step comprising the sub-steps of:

calculating a discontinuity value based on values of a current pixel and of pixels adjacent to said current pixel, determining an artifact value of the current pixel from discontinuity values of the current pixel and of neighboring pixels of the current pixel, identifying blocking artifacts from artifact values.

Such a data processing method permits to detect the blocking artifacts on the basis of a simple continuity test, which blocking artifacts originate from the block-based coding technique. This continuity test as well as the step of determining an artifact value require only a limited number of pixels, that is, the current pixel and several pixels around the current pixel. In the preferred embodiment the discontinuity value is computed from the comparison between a value of a current pixel and a half-sum of the values of the pixels immediately preceding and following the current pixel. The data processing method according to the invention consequently requires only minor calculation resources for detecting the blocking artifacts.

Moreover, the processing method according to the prior art does not differentiate the block borders which correspond to blocking artifacts from the ones that correspond to the natural object contours contained in the image. A post-processing of the block borders detected by such a method thus risks to degrade the natural contours contained in the image.

Therefore, the data processing method according to the invention further comprises a gradient filter step of filtering the values of the pixels, suitable for detecting a natural contour area in the digital input image.

Thus, during a post-processing step, the pixels coming from the blocking artifact detection step will be processed with the exception of the pixels contained in the natural contour areas determined by the gradient filter step.

Finally, the method described in the prior art document requires to know the decoding parameters of the digital input image. These decoding parameters are accessible on the decoder side, but are not accessible on the television receiver side.

Therefore, the data processing method is characterized in that it comprises the sub-steps of:

storing a position in the image of blocking artifacts originating from the identification step in a table, calculating a position of a grid corresponding to the blocks of the block coding technique from a majority position of the blocking artifacts in the table, and calculating a grid size from a larger value among values of counters which represent a number of occurrence of a distance between a current vertical blocking artifact and an immediately preceding vertical blocking artifact.

Determining the size and position of the grid corresponding to the blocks of the block coding technique permits to apply the post-processing step in adapted form without the need to know the decoding parameters.

These and other aspects of the invention are apparent from and will be elucidated, by way of non-limitative example, with reference to the embodiment(s) described hereinafter.

Figure 2A:
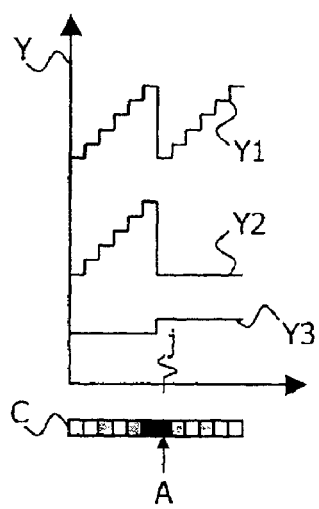
Figure 2B:
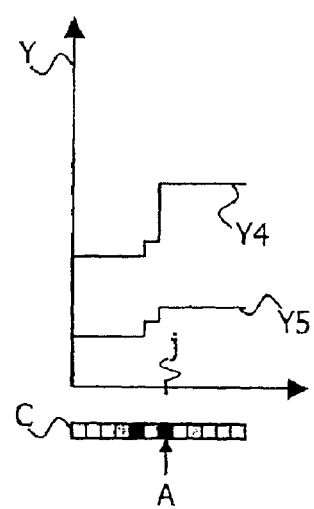
Figure 3:
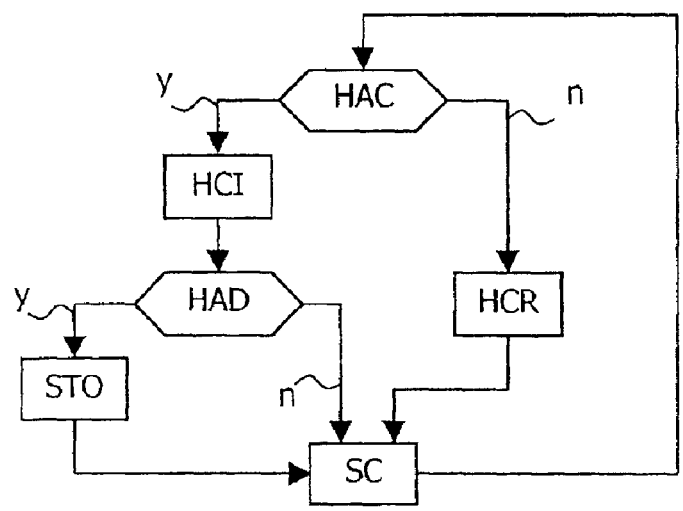
Figure 4:
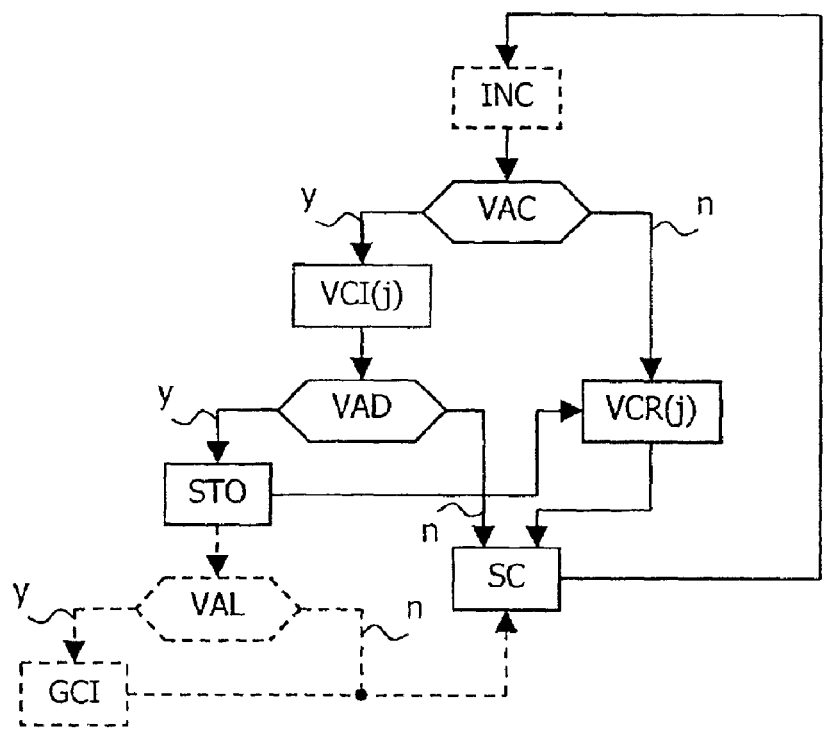
Figure 5:
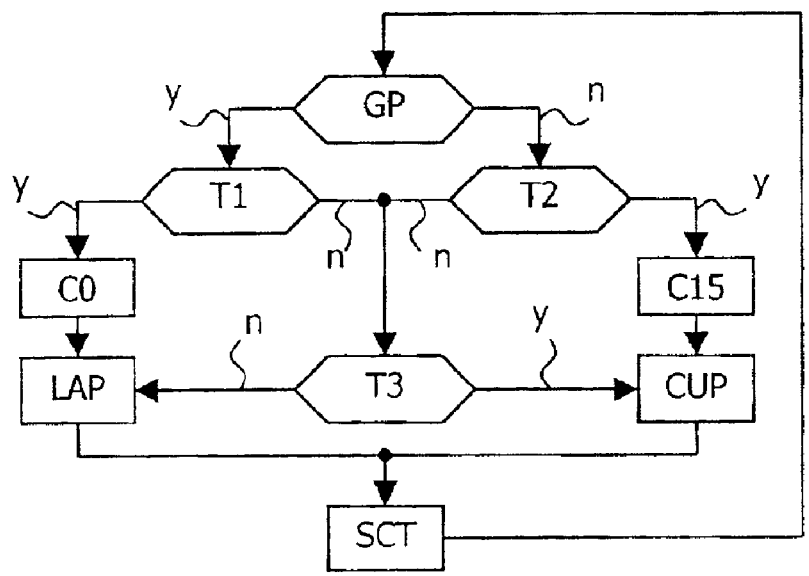
Figure 6:
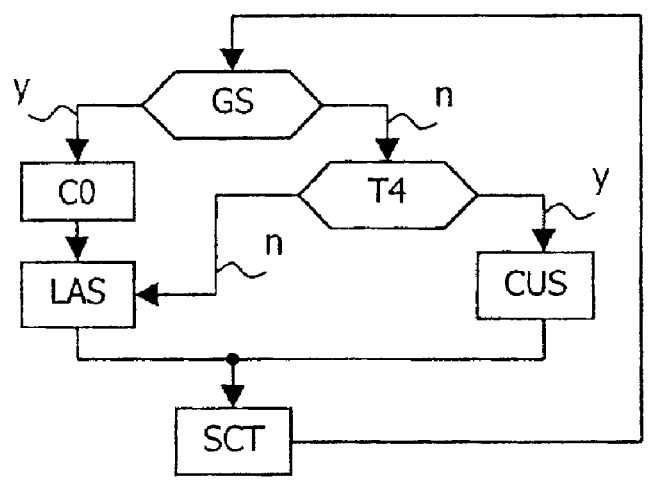

In the drawings:

FIG. 1 is a diagram representing the data processing method according to the invention, FIGS. 2a and 2b illustrate the step of determining block artifacts for various configurations of pixel values, FIG. 3 is a diagram representing the steps of identifying and storing block artifacts originating from the block-based coding technique in a horizontal direction, FIG. 4 is a diagram representing the identification and block artifact storage steps originating from the block-based coding technique in a vertical direction, FIG. 5 is a diagram representing the step of calculating the position of the grid, FIG. 6 is a diagram representing the step of calculating the size of the grid, FIGS. 7a and 7b illustrate the gradient filter step, which permits to detect a natural contour area in a horizontal and vertical direction, respectively, and FIGS. 8a and 8b illustrate the low-pass filter step, which permits to process the block artifacts originating from the block-based coding technique in a horizontal and vertical direction, respectively.

The present invention relates to a method of processing data which are contained in a digital video input signal, said method being intended for improving the visual quality of said digital video signal when the latter has previously been coded according to a block-based coding technique.

The data processing method has been developed more particularly in the framework of coded and then decoded digital image sequences according to the MPEG standard. The method nevertheless remains applicable for any other digital video signal which has been coded and then decoded according to a block-based coding technique such as H.261 or H.263, for example.

FIG. 1 represents a diagram of the data processing method according to the invention. Said data processing method comprises:

a gradient filter step (GF) of values (Y) of the pixels permitting to detect (THR) a natural contour area (NC) in the digital input image, a blocking artifact detection step (BAD), which artifacts originate from the block-based coding technique and said detection step comprises the sub-steps of:

calculating (CT) a discontinuity value based on the values (Y) of a current pixel and of adjacent pixels of said current pixel, determining (BAC) an artifact value of the current pixel based on discontinuity values of the current pixel and of neighboring pixels of the current pixel, identifying (ID) blocking artifacts based on artifact values, storing (STO) in a table a position in the image of the block artifacts coming from the identification step (ID), and calculating (GRID) a position of a grid that corresponds to the blocks of the block-based coding technique from a majority position of the blocking artifacts in the table, and calculating a grid size from a larger value of counter values that represent a number of times that a distance occurs between a current vertical block artifact and a vertical block artifact immediately preceding the latter, a low-pass filter step (LPF) of values (Y) of the pixels coming from the blocking artifact detection step (BAD), with the exception of the pixels contained in the natural contour areas (NC) determined by the gradient filter step.

In a first instance, it is an object of the data processing method to detect the blocking artifacts which originate from a separate coding, via the block-based coding technique of blocks of n×n pixels, with n=8 in the case of the MPEG standard.

For this purpose, it is necessary in the first place to extract the natural contours and the structure of the image so as to avoid erroneous detections of blocking artifacts. Therefore, the blocking artifact detection method comprises a gradient filter step (GF) of the values (Y) of the pixels contained in the digital input image so as to produce filtered values (G). In the preferred embodiment said gradient filter step utilizes Sobel filters and the values (Y) of the pixels in question are the luminance values. Such filters have been chosen as they ensure both a robust and an efficient contour detection. Moreover, besides their calculation function of a gradient, these filters have a smoothing effect of the filtered data which augments, on the one hand, their robustness to the detection of contours in the case of a noise image and permits, on the other hand, to avoid the comparison of pixels due to ringing noise with natural contours. The Sobel filters $S_H$ and $S_V$ applied horizontally and vertically, respectively, are the following:

$$S_H = \begin{bmatrix} -1 & -2 & -1 \\ 0 & 0 & 0 \\ 1 & 2 & 1 \end{bmatrix}$$

$$S_V = \begin{bmatrix} -1 & 0 & 1 \\ -2 & 0 & 2 \\ -1 & 0 & 1 \end{bmatrix}$$

The luminance values $G_H$ and $G_V$ after filtering are thus $G_H = Y.S_H$ and $G_V = Y.S_V$. These filtered values (G) are then compared with threshold values (THR). If they are higher than the threshold values, then a natural contour (NC) will be detected. These threshold values are to be sufficiently low to detect the homogeneous structures, but must be sufficiently high so as not to extract discontinuities due to blocking artifacts and not due to natural contours. In the preferred embodiment the horizontal threshold values $THR_H$ and vertical threshold values $THR_V$ are equal to 35 and 50, respectively, for the luminance values varying from 0 to 255.

The blocking artifact detection method also includes a step (CT) which permits to test the continuity or discontinuity of a value of a current pixel relative to the pixels which are adjacent thereto. The detection of the discontinuity points is based on the study of the second derivative of the discrete function formed by the successive luminance values (Y). This second derivative is zero if:

$$2 \cdot Y(i,j) = Y(i-1,j) + Y(i+1,j) \text{ in a vertical direction,} \quad (1)$$

$$2 \cdot Y(i,j) = Y(i,j-1) + Y(i,j+1) \text{ in a horizontal direction,} \quad (2)$$

where $Y(i,j)$ is the luminance value of the pixel of position $(i,j)$.

A vertical discontinuity value $c_v(i,j)$ or a horizontal discontinuity value $c_h(i,j)$ in the horizontal direction are deduced by the equations (1) and (2), respectively. In the preferred embodiment the discontinuity value is a binary value equal to 1 if the second derived value is zero, thus if there is continuity of the luminance values, and equal to 0 in the opposite case, that is:

$$c_v(i, j) = \begin{cases} 1 & \text{si } 2 \cdot Y(i, j) = Y(i-1, j) + Y(i+1, j) \\ 0 & \text{if not} \end{cases} \quad (3)$$

$$c_h(i, j) = \begin{cases} 1 & \text{si } 2 \cdot Y(i, j) = Y(i, j-1) + Y(i, j+1) \\ 0 & \text{if not} \end{cases} \quad (4)$$

The step (CT) of testing the discontinuity is followed by a step of determining (BAC) an artifact value of the current pixel based on discontinuity values of the current pixel and of neighboring pixels of the current pixel.

FIGS. 2a and 2b illustrate the step of determining blocking artifacts for different pixel configurations (Y1 to Y5). The discontinuity values (C) are also represented for the pixels taken into consideration when the artifact (A) is determined, a discontinuity value equal to 0 being represented by a black square and a value equal to 1 being represented by a gray square. A first type of artifact $A_{v1}$ is determined on the basis of the equation (5), which corresponds to FIG. 2a:

$$Av1(i,j) = \overline{c_h(i,j-1)} \cdot \overline{c_h(i,j)} \cdot (c_h(i,j+1) + c_h(i,j+3) + c_h(i,j-4) + c_h(i,j-2)) \quad (5)$$

where $\bar{c}$ represents the complementary value of c.

A second type of artifact $A_{v2}$ is determined based on the equation (6), which corresponds to FIG. 2b:

$$Av2(i,j) = c_h(i,j-3) \cdot \overline{c_h(i,j-2)} \cdot \overline{c_h(i,j)} \cdot c_h(i,j+2) \quad (6)$$

These two equations are preferably used for determining vertical artifacts. For detecting horizontal artifacts, the artifact Ah is determined on the basis of the following equation:

$$Ah(i,j) = c_v(i,j) \cdot \overline{c_v(i+1,j)} \quad (7)$$

In effect, the vertical sub-sampling in the case of images formed by two interleaved frames leads to the use of a simpler equation, the processing of the frame in the vertical direction being costly in terms of memory. In a more general way these various equations all have the same objective, that is to say, to determine a discontinuity centered on the current pixel having position (i,j), and determining a continuity in its vicinity. Thus, the present invention is not at all limited by these equations. Furthermore, the dark areas in which natural interference called "clamping noise" may occur, are generally excluded from the artifact determination area.

The result of this determining step is a horizontal or vertical artifact value which is equal to 1 for a pixel having position (i,j) when one or various of the equations (1) to (3) or similar equations leads to determining an artifact (A).

The method of detecting blocking artifacts then comprises a step of identifying (ID) blocking artifacts based on previously determined artifact values. The FIGS. 3 and 4 are diagrams which represent this identification step in a horizontal and vertical direction, respectively. The general idea of this identification step is that a horizontal or vertical block artifact is identified if W consecutive artifacts in a horizontal direction or H consecutive artifacts in a vertical direction have been determined, where H is the height of a block and W its width.

According to FIG. 3, if a horizontal artifact (HAC) has been determined (y), a horizontal counter (HCI) is incremented. The value of this horizontal counter is compared with the width W of a block (HAD). If the value of the horizontal counter is higher than W (y), then a horizontal blocking artifact is identified and a table hTab permits to store during a storing step (SCO) a first blocking artifact counter at the position i % H, where i is the line of the image where the horizontal blocking artifact is, % is the operator of which the result is the remainder of the ratio of i to H. If no blocking artifact at all is identified for the current pixel (n), then the following pixel is tested (SC). If no artifact has been determined for the current pixel (n), then the horizontal counter is reset to 0 (HCR) after which the following pixel is tested (SC).

According to FIG. 4, if a vertical artifact (VAC) has been determined (y), then a vertical counter (VCI(j)) is incremented for the column j of the image where the vertical blocking artifact is. The value of this vertical counter is compared with the height H of a block (VAD). If the value of this vertical counter becomes higher than H (y), then a vertical blocking artifact is identified (y) and the table vTab permits to store during a storing step (STO) a second blocking artifact counter at position j % W. If no blocking artifact is identified for the current pixel (n), then the next pixel is tested (SC). If no artifact has been determined for the current pixel (n), then the counter is reset to 0 for the column involved (VCR(j)), after which the next pixel is tested (SC). Moreover, the vertical counter is preferably reset to 0 for the column j (VCR(j)) after the storing step, this in order to reduce the storage costs.

The tables hTab and vTab permit to deduce the distribution probability of a grid corresponding to the size of the coding blocks.

In effect, an image belonging to a digital video signal coded according to the MPEG standard comprises blocks of 8 lines and 8 pixels, the first image block starting at position (0,0). For reasons of digital-to-analog and analog-to-digital conversions and as a result of the possible use of pre-processing algorithms of the digital video signal, an original image belonging to said signal may be shifted by several pixels. On the other hand, the original image may be coded according to various horizontal coding formats so as to keep a good visual quality for low transmission rates. In that case the original image is downsampled horizontally before being coded, and is then upsampled horizontally during the decoding so as to find its initial format back. The result is a modification of the size of the grid due to the upsampling, the coding always being effected on blocks of 8 lines and 8 pixels. If the position and size values of the grid are known during the decoding in a decoder or a set top box, this does not hold for a television receiver that receives an analog signal that does not contain such information.

In order to remedy this drawback, the data processing method according to the invention comprises a step (GRID) of calculating a position of a grid corresponding to the blocks of the block-based coding technique from a majority position of the block artifacts in the table, and on a grid size from a larger value of the counter values which represent a number of times a distance occurs between a current vertical blocking artifact and an immediately preceding vertical blocking artifact. This calculation step (GRID) of the current size or of the current position of a grid for a current image is carried out as a function of the sizes or preceding positions of the grids determined for the preceding images and as a function of a confidence parameter which is representative of the evolution of the values of said sizes or preceding positions according to the diagrams of FIG. 5 or 6. In the preferred embodiment it is supposed that no format conversion is necessary in the vertical direction and that two format conversions are possible in the horizontal direction, resulting in three possible grid sizes H×W: 8×8 pixels, 8×10 pixels and 8×12 pixels. The invention is not restricted, however, to these three sizes which are the most frequently used by the MPEG coding.

In order to detect the size of the grid, FIG. 4 introduces additional steps represented in dotted lines. The principle of these steps is to determine whether a current vertical blocking artifact is distant from the last vertical blocking artifact stored of 8, 10 or 12 pixels. In the preferred embodiment a general counter is created and then incremented (INC) after the next pixel has been read (SC). At the output of the storage step (STO), the value of this general counter is compared with the values 8, 10 and 12 (VAL). If the value of the general counter is equal to 8, 10 or 12, then one of the counters grid8, grid10 and grid12 which relate to a width of the grid of 8, 10 and 12 pixels, respectively, is incremented (GCI) after which the next pixel is read (SC).

The position of the grid (GP) is determined by searching for the most probable values (imax,jmax) in the tables hTab[i] and vTab[j] after a frame or an image has been processed depending on whether the image is interleaved or not. These most probable values are either the values giving the maximum values hTab and vTab, or the values such that the probability $p_k$ that the grid is at the position (imax,jmax) is higher than a predetermined threshold (y), for example 50% in each of the horizontal and vertical direction, where $$p_k = \frac{Tab[k]}{\sum_z Tab[z]} \text{ with } Tab = hTab \text{ or } vTab \tag{8}$$

According to FIG. 5, if the position of the grid has changed (GP) relative to the preceding image (the position is supposed not to change during the initialization or if the most probable values cannot be determined), a first test (T1) is carried out to know whether the value of a position counter after decrementation is lower than a first predetermined threshold, for example 0. If this is the case (y), then the position counter is set to the value of the first threshold (C0) and the last value of the grid position is used (LAP), which value is initially (0,0), for example; then the frame or the next image is investigated (SCT). If the position of the grid (GP) has not changed (n), then a second test (T2) is carried out to know whether the value of the position counter after incrementation is higher than a second predetermined threshold, for example 15. If this is the case (y) then the counter is set to the value of the second threshold (C15) and the current value of the grid position is used (CUP); then the next frame or image is investigated (SCT). If the first or second test (T1 or T2) is not satisfactory (n), then a third test (T3) is carried out to know whether the value of the position counter is higher than a third predetermined threshold, for example 5. If this is the case (y), then the current value of the grid position is used (CUP); if not (n) the last value of the grid position is used (LAP). Thus, the position of the grid determined for the current image is confirmed or denied based on the value of the position counter which forms a representative confidence parameter of the coherence of the position of the grid during this period. A change of the position of the grid is thus only possible if various consecutive frames show the same position, a new position being all the more difficult to confirm if the preceding position was in its place for many frames (in our example 15).

The size of the grid (GP) is determined by searching for the largest value among the values of the counters grid8, grid10 and grid12 after processing of a frame or of an image according to whether the image is interleaved or not. According to FIG. 6, if the size of the grid (GS) has changed relative to the preceding image (y), then a size counter is set to 0 (C0) and the last value of the size of a grid is used (LAS), this value being initially 8×8 pixels, for example; then the next frame or image is investigated (SCT). In the opposite case (n), a fourth test (T4) is carried out to know whether the value of the size counter after incrementation is higher than a threshold value fixed at 5 in our example. If this is the case (y), then the current value of the grid size is used (CUS); if not (n) the last value of the grid size is used (LAS). Thus the size counter forms a confidence parameter which permits to obtain a coherence of the size of the grid during a period of time, the size of the grid can only be modified if 5 consecutive frames give the same grid size.

Other methods are possible for determining the size and position of the grid. For example, the diagram of FIG. 6 can be applied for determining the position of the grid.

The detection method that has just been described permits to detect whether a video signal received by a set top box or a simple television receiver has been coded according to a block-based coding technique. Depending on the result of the detection method, corrective actions are then decided on. These actions are, for example, not to apply a particular image processing method, or, in contrast, to apply a post-processing method as a function of the data produced by the detection method.

In the preferred embodiment a post-processing method is implemented. This method comprises a low-pass filter step (LPF) of the values (y) of the pixels coming from the block artifact detection step (BAD) with the exception of the pixels contained in the natural contour areas (NC) determined by the gradient filter step (GF, THR). The result of this filter step is an image which contains filtered pixel values (Yf) and whose visual quality is improved relative to the image before processing.

FIGS. 7a and 7b define the natural contour areas in a horizontal and a vertical direction, respectively. These areas comprise a vertical natural contour (VNC) and several pixels on both sides of this contour (EA) in a horizontal direction; a horizontal natural contour (HNC) and several pixels on both sides of this contour (EA) in a vertical direction.

The filters used during this filter step (LPF) are preferably applied to detected artifacts. Thus the efficiency of the filtering depends in essence on the efficiency of the detection. For this reason, the cost of implementation of the filter step is also reduced. Moreover, the filter step is completely independent of the block artifact detection step and may consequently be adapted according to the user's wish and the parameters coming from the detection step. Two filter options are proposed here by way of example.

In a first embodiment filters LP5 having 5 coefficients and LP9 having 9 coefficients are used for a vertical and a horizontal filtering, respectively. These filters are, for example:

$$LP5 \begin{cases} \text{the first and last pixel are not filtered} \\ \text{the second and last-but-one pixel are filtered} \\ \text{by the filter } \frac{1}{4}[1 \ 2 \ 1] \\ \text{the other pixels are filtered by the} \\ \text{filter } \frac{1}{16}[1 \ 4 \ 6 \ 4 \ 1] \end{cases} \quad (9)$$

$$LP9 \begin{cases} \text{the first and last pixel are not filtered} \\ \text{the second and last-but-one pixel are filtered} \\ \text{by the filter } \frac{1}{4}[1 \ 2 \ 1] \\ \text{the other pixels are filtered by the} \\ \text{filter } \frac{1}{16}[1 \ 1 \ 2 \ 2 \ 4 \ 2 \ 2 \ 1 \ 1] \end{cases} \quad (10)$$

In a second embodiment the filters are variable-length filters defined by the diagrams of FIGS. 8a and 8b for a horizontal and a vertical filtering, respectively. By way of example the horizontal filter corresponds to the following equations:

$$\text{for the pixel } (i-4): \frac{1}{2}[1 \ 1] \quad (11)$$

$$\text{for the pixel } (i-3): \frac{1}{4}[1 \ 1 \ 1 \ 1]$$

$$\text{for the pixel } (i-2): \frac{1}{8}[1 \ 1 \ 2 \ 2 \ 1 \ 1]$$

...

$$\text{for the pixel } i: \frac{1}{8}[1 \ 1 \ 1 \ 1 \ 1 \ 1 \ 1 \ 1]$$

...

where ADD represents an addition and >> a shift of bits to the right corresponding to a division by 2 (>>1), 4 (>>2), etc. Such filters may be implemented in a simple manner for low memory costs.

The description above with reference to FIGS. 2 to 8 illustrates the invention rather than limits the invention. It is evident that there are other alternatives which come within the scope of the appended claims.

There are many ways of implementing the described functions by means of software. With regard to this, the FIGS. 2 to 8 are highly diagrammatic, each Figure representing a single embodiment. Thus, although a Figure shows various functions in the form of separate blocks, this does not exclude that a single software item caries out various functions. This does not exclude either that one function can be carried out by a software unit.

It is possible to implement these functions by means of a television receiver circuit or a digital television receiver/decoder circuit, the latter circuit being suitably programmed. A set of instructions contained in a program memory may cause the circuit to carry out various operations described earlier with reference to FIGS. 2 to 8. The set of instructions may also be loaded in the program memory by reading a data carrier such as, for example, a disc that contains the set of instructions. The reading may also be carried out via a communication network such as, for example, the Internet. In that case a service provider will make the set of instructions available to interested parties.

No reference sign in parentheses in a claim must be interpreted in a limiting fashion. The word "comprising" does not exclude the presence of other elements or steps stated in a claim. The word "a" preceding an element or a step does not exclude the presence of a plurality of these elements or of these steps.

What is claimed is:

1. A method of processing data contained in a digital input image in the form of pixels, said method comprising a blocking artifact detection step which artifacts originate from a block-based coding technique, said detection step comprising the sub-steps of:

calculating a discontinuity value based on values of a current pixel and of pixels adjacent to said current pixel, determining an artifact value of the current pixel from discontinuity values of the current pixel and of neighboring pixels of the current pixel, identifying blocking artifacts from artifact values, storing a position in the image of blocking artifacts originating from the identification step in a table, and calculating a position of a grid corresponding to the blocks of the coding technique blocks from a majority position of the block artifacts in the table.

2. A data processing method as claimed in claim 1, wherein the calculation sub-step is adapted to detect a discontinuity if a value of a current pixel is different from a half-sum of a value of the pixel immediately preceding and from the value of the pixel immediately following the current pixel.

3. A data processing method as claimed in claim 1, further comprising a gradient filter step of values of the pixels, adapted to detect a natural contour area in the digital input image.

4. A data processing method as claimed in claim 3, wherein the gradient filtering utilizes a Sobel filter.

5. A data processing method as claimed in claim 3, further comprising a low-pass filter step of the values of the pixels coming from the blocking artifact detection step with the exception of the pixels contained in the natural contour areas determined by the gradient filter step.

6. A data processing method as claimed in claim 1, wherein the calculation sub-step is adapted to determine a grid size from a larger value of the counter values representing a number of times that a distance occurs between a current vertical blocking artifact and a vertical blocking artifact immediately preceding it.

7. A data processing method as claimed in claim 1, wherein the calculation sub-step of the current size or of the current position of the grid for a current image is effected as a function of preceding sizes or positions of the grid determined for preceding images and as a function of a confidence parameter which represents the evolution of the values of said preceding sizes or positions.

8. A computer program product for a television receiver comprising a set of instructions which, when they are loaded in a circuit of the television receiver, causes this circuit to carry out the data processing method as claimed in claim 1.

9. A computer program product for a decoder comprising a set of instructions which, when they are loaded in a circuit of said decoder, causes said circuit to carry out the data processing method as claimed in claim 1.

* * * * *